Feb. 5, 1963 C. D. SKIRVIN 3,076,897

PHOTOELECTRICALLY CONTROLLED TRANSISTOR CIRCUIT

Filed Oct. 25, 1961

INVENTOR.

CLIFFORD D. SKIRVIN

BY Gene W. Arant

ATTORNEY

United States Patent Office 3,076,897

Patented Feb. 5, 1963

3,076,897

PHOTOELECTRICALLY CONTROLLED TRANSISTOR CIRCUIT

Clifford D. Skirvin, 371 Mulberry Drive, Pomona, Calif.

Filed Oct. 25, 1961, Ser. No. 147,662
1 Claim. (Cl. 250—209)

The present invention relates to a transistor circuit controlled by a photoelectric device, in which the photoelectric device is normally illuminated and the transistor is normally non-conductive, the transistor becoming conductive in response to shading of the photoelectric device.

A practical problem in the design of photoelectric control circuits is that of obtaining maximum reliability and sensitivity consistent with minimum cost. The primary advantage of the present invention is that, by virtue of the circuit arrangement, the currents flowing through the active elements are kept to a minimum and the circuit sensitivity is therefore kept at a maximum.

One object of the invention, therefore, is to provide a photoelectric control circuit having a minimum level of current flow through the active circuit elements and having a maximum sensitivity of response.

Another object of the invention is to provide a photoelectric control circuit which includes a plurality of separate photoelectric devices, and is actuable in response to the shading of any one of these devices.

A separate and completely unrelated object of the invention is to provide a switching circuit that is operable for producing an output pulse in response to switching in one direction, but not in response to switching in the other direction.

A further object of the invention is to provide a photoelectric control circuit which is particularly adapted for use at an automobile service station, for actuating a signaling device for a predetermined time period in response to the shading of any one of a plurality of photoelectric devices that are positioned at various entrances or approaches to the service station area.

The objects and advantages of the invention will be more readily understood from the following description considered in conjunction with the accompanying drawing, in which.

Figures 1, 2:
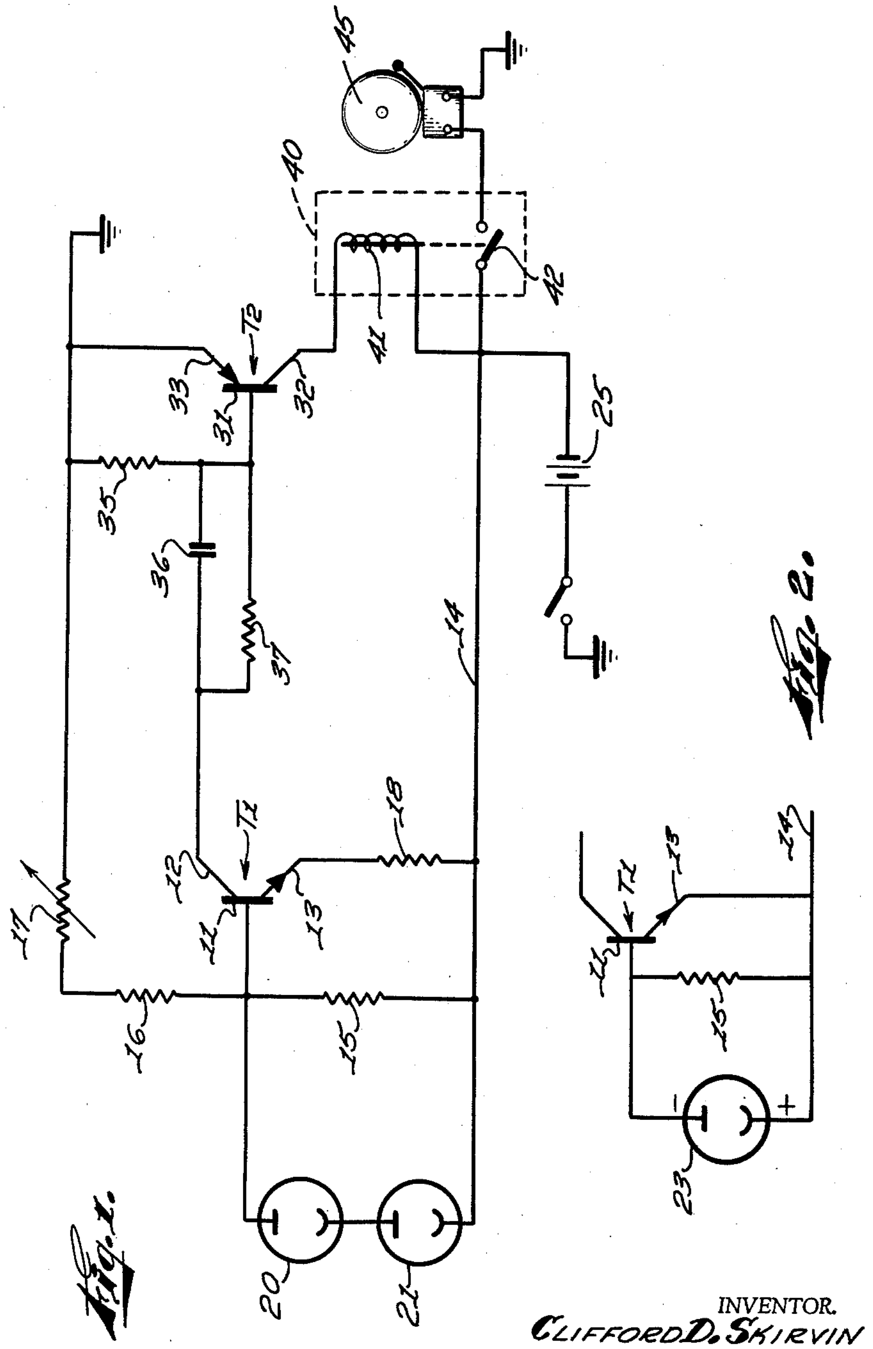
FIGURE 1 is a schematic diagram of one form of the invention.
FIGURE 2 is a schematic diagram of an alternate form of the input circuit.

Referring now to FIGURE 1, photoconductive detectors 20 and 21 are connected together in series, the series combination thereof being connected in parallel with a resistor 15. Detectors 20 and 21 are of a type which, when illuminated, exhibit a series resistance of approximately 1,000 ohms or perhaps as little as 200 ohms, but which when shaded or protected from the incidence of radiant energy display a series resistance of many thousands of ohms. The resistor 15 has a resistance which is many times greater than that of the detectors when fully illuminated. For example, resistor 15 has preferably a value of 47,000 ohms.

A transistor T1 is of the NPN type having a base 11, collector 12, and emitter 13. A lead 14 is connected to one end of the resistor 15, as well as to the series combination of the detectors 20, 21. A resistor 18 which has a very small ohmic value compared to the resistor 15 is connected between emitter 13 and the lead 14. Lead 14 is connected to the negative output terminal of a battery or other direct current energy supply device 25. A resistor 16 having preferably a value of 3,300 ohms is connected to the base 11 of transistor T1, and a variable resistor 17 is connected between the other end of resistor 16 and the ground return side of power supply 25. Variable resistor 17 has, preferably, a maximum resistance value of one megohm.

In the operation of the circuit, the photoelectric control of transistor T1 is accomplished as follows. Resistor 17 is adjusted to suit the particular operating conditions of the circuit and, thereafter, has a fixed resistance value. Resistor 15 therefore provides one fixed resistive circuit branch of a voltage divider, while resistors 16 and 17 together provide the other fixed resistive circuit branch of the voltage divider, the juncture of these two branches being connected to the base of the transistor T1 which is to be controlled. The detectors 20, 21 being in parallel with the first circuit branch of the voltage divider control the voltage division ratio, and hence, the bias potential applied to base 11 of the transistor T1. When both detectors are fully illuminated their resistance is very small compared to that of the resistor 15, and also very small compared to the sum total of the resistance values of the resistors 16 and 17, and hence the bias potential of the base 11 of transistor T1 is very near to the potential of the conductor 14. By virtue of the inclusion of resistor 18 in series with the emitter 13 the transistor T1 is then biased to a non-conductive state. It may perhaps be preferred to omit the ressistor 18 from the circuit, in which case, when both detectors are fully illuminated, transistor T1 is still rendered substantially non-conductive.

Upon the shading of either one of the detectors 20, 21 its series resistance is multiplied many times, substantially changing the voltage division ratio, and hence changing the bias potential of the base 11 so that the transistor T1 becomes fully conductive. This response occurs whether two detectors are used in series connection as shown, or only a single detector is used. It will be understood that for service station applications it may be desirable to use more than two detectors in series, so that the transistor T1 will be rendered conductive in response to the shading of any one of the several detectors that may be positioned at various incoming approaches to the service station area.

A second transistor T2 is of the PNP type, and has a base 31, collector 32, and emitter 33. Emitter 33 is connected to ground. Collector 32 is connected to one end of the energizing coil 41 of a relay 40, the other end of coil 41 being connected to the negative output terminal of the power supply 25. A resistor 35 having preferably a value of 10,000 ohms is connected between ground and the base 31 of transistor T2. A capacitor 36 having preferably a value of 25 microfarads is connected between the collector 11 of the first transistor T1 and the base 31 of the second transistor T2. A resistor 37 having preferably a value of 68,000 ohms is connected in parallel with the capacitor 36.

The normal condition of the circuit of FIGURE 1 is that the detectors 20 and 21 are fully illuminated, since even at night time the approaches to a service station area are normally illuminated by artificial means. Thus, normally, transistor T1 is non-conductive, and by virtue of the illustrated circuit arrangement the transistor T2 is also biased to a non-conductive state, or substantially so. That is, the normal potential of the base 31 of transistor T2 is nearly identical to the ground potential of the circuit. Whenever transistor T1 switches from one state to the other a signal flows through the coupling circuit to the base 31 of T2. It will be recognized that the coupling circuit consisting of capacitor 36 and resistor 37 in parallel is in fact a differentiator circuit. When transistor T1 switches from its non-conductive state to its conductive state there is an immediate change in the potential of the base 31 of transistor T2, due to the series current flow through resistors 35 and 37 and the collector 12 and emitter 13 of transistor T1. Transistor T2 therefore becomes conductive. However, capacitor 36 then commences to charge up, drastically reducing the bias potential on the base 31, so that after a time interval determined by the time constant of the circuit the transistor T2 becomes biased to a condition of very low conductivity. Thus, an energy pulse is delivered from the transistor T2 for actuating the relay 40, the relay 40 including a switch 42 which remains closed only during the period of energization. When switch 42 is closed a bell or other signaling device 45 connected in series therewith is energized, but upon conclusion of the energy pulse generated by transistor T2 the switch 42 opens and the signaling device again becomes inoperative.

When transistor T1 switches in the opposite direction, however, no energy pulse is produced by transistor T2. The reason for this is that the pulse generated from transistor T1 merely drives the base 31 of transistor T2 in a reverse-biased direction, and the charging of the capacitor 36 returns the base 31 to its normal bias potential, all without rendering the transistor T2 fully conductive.

Referring now to the alternate circuit form of FIGURE 2, resistor 18 is omitted and a single photovoltaic cell 23 is utilized in lieu of the detectors 20, 21. The cell 23 when illuminated generates a potential, the polarity of connection being such that the upper terminal of the cell connected to the base 11 of transistor T1 becomes negative while the lower terminal of the cell connected to lead 14 becomes positive. Thus, during the normal circuit condition, when the cell is illuminated, the output voltage from the photovoltaic cell serves to insure that the transistor T1 remains biased to a completely non-conductive state. When the cell 23 is shaded its resistance is multiplied many times, the voltage division ratio changes, and transistor T1 becomes conductive, just as in the circuit of FIGURE 1.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

I claim:

An alarm circuit comprising first and second transistors, said second transistor being normally biased to the non-conducting state, a signaling device coupled to the output of said second transistor and adapted to be energized whenever said second transistor becomes conductive, a differentiating circuit coupled between the output of said first transistor and the input of said second transistor and operable for causing said second transistor to become temporarily conductive each time that said first transistor is switched from the non-conductive state to the conductive state, a voltage divider including a pair of fixed resistive circuit branches whose juncture is connected to the base of said first transistor, and at least two normally illuminated photoelectric devices connected together in series, the series combination thereof being coupled in parallel with one of said fixed resistive circuit branches, the resistance of said one fixed resistive circuit branch being at least several times the resistance of any one of said photoelectric devices when illuminated, whereby said voltage divider normally biases said first transistor to a non-conductive state, the circuit action being such that the shading of any one of said photoelectric devices causes said first transistor to become conductive thereby energizing said signaling device.

References Cited in the file of this patent

UNITED STATES PATENTS

| | | |
|---|---|---|
| 2,016,036 | FitzGerald | Oct. 1, 1935 |
| 2,853,633 | McVey | Sept. 23, 1958 |
| 2,928,949 | Steinbuch | Mar. 15, 1960 |
| 2,947,875 | Beck | Aug. 2, 1960 |
| 2,995,687 | Mayberry | Aug. 8, 1961 |
| 2,997,606 | Hamburger et al. | Aug. 22, 1961 |
| 3,005,114 | Martin et al. | Oct. 17, 1961 |
| 3,029,345 | Douglas | Apr. 10, 1962 |
| 3,037,144 | La Mantia | May 29, 1962 |